US012798095B2

(12) United States Patent
Li et al.

(10) Patent No.: US 12,798,095 B2
(45) Date of Patent: Nov. 17, 2026

(54) TRAJECTORY PLANNING METHOD FOR LOWER LIMB EXOSKELETON, CONTROL DEVICE AND COMPUTER-READABLE STORAGE MEDIUM

(71) Applicant: UBTECH ROBOTICS CORP LTD, Shenzhen (CN)

(72) Inventors: Wenzhou Li, Shenzhen (CN); Chunyu Chen, Shenzhen (CN); Huan Tan, Shenzhen (CN)

(73) Assignee: UBTECH ROBOTICS CORP LTD., Shenzhen (CN)

( * ) Notice: Subject to any disclaimer, the term of this patent is extended or adjusted under 35 U.S.C. 154(b) by 59 days.

(21) Appl. No.: 19/026,668

(22) Filed: Jan. 17, 2025

(65) Prior Publication Data

US 2025/0332724 A1 Oct. 30, 2025

(30) Foreign Application Priority Data

Apr. 30, 2024 (CN) ......................... 202410544336.8

(51) Int. Cl.
*B25J 9/16* (2006.01)
*B25J 9/00* (2006.01)

(52) U.S. Cl.
CPC ........... *B25J 9/1664* (2013.01); *B25J 9/0006* (2013.01)

(58) Field of Classification Search
CPC .............................. B25J 9/1664; B25J 9/0006
See application file for complete search history.

(56) References Cited

U.S. PATENT DOCUMENTS 10,031,524 B2 * 7/2018 Su .............................. B25J 9/16
2020/0276698 A1 * 9/2020 Ding ........................ B25J 9/163
2023/0069928 A1 * 3/2023 Brossette ............. A61H 1/0266
2023/0278212 A1 * 9/2023 Luo .......................... B25J 9/163 700/254
2024/0399187 A1 * 12/2024 Seo ........................ B25J 9/0006
2025/0332724 A1 * 10/2025 Li .......................... B25J 9/1664
2026/0192450 A1 * 7/2026 Xie ........................ B25J 9/1664

FOREIGN PATENT DOCUMENTS

CN 106137687 A * 11/2016 ............... A61H 3/00
CN 110076758 A * 8/2019 ............ B25J 9/0072
CN 113183128 A * 7/2021 ............ B25J 9/0006

(Continued)

OTHER PUBLICATIONS

JP-2004073649-A translation (Year: 2004).*
CN-113183128-A translation (Year: 2021).*
WO-2021160967-A1 translation (Year: 2021).*
CN-110076758-A translation (Year: 2019).*
CN-112859868-B translation (Year: 2022).*

(Continued)

*Primary Examiner* — Kyle T Johnson

(57) ABSTRACT

A trajectory planning method for a lower limb exoskeleton includes: determining a state space equation corresponding to the lower limb exoskeleton using dynamic analysis; determining an objective function for trajectory planning of the lower limb exoskeleton according to the state space equation, wherein a phase variable corresponding to the objective function is a time-related phase variable; and performing trajectory planning of the lower limb exoskeleton according to the objective function to obtain a first gait trajectory corresponding to the lower limb exoskeleton, wherein the first gait trajectory is a gait trajectory corresponding to the time-related phase variable.

15 Claims, 3 Drawing Sheets

(56) References Cited

FOREIGN PATENT DOCUMENTS

| | | | | | |
|---|---|---|---|---|---|
| CN | 112859868 | B | * | 7/2022 | ........... G05D 1/0223 |
| CN | 116211654 | A | * | 6/2023 | ............... A61H 3/00 |
| CN | 117260715 | A | * | 12/2023 | ............ B25J 9/1664 |
| CN | 118409504 | A | * | 7/2024 | ........... G05B 13/042 |
| CN | 118593294 | A | * | 9/2024 | .......... G06F 18/2411 |
| CN | 118975917 | A | * | 11/2024 | ............... A61H 3/00 |
| JP | 2004073649 | A | * | 3/2004 | ............. A61H 3/008 |
| KR | 20200122343 | A | * | 10/2020 | ............ B25J 9/0006 |
| WO | WO-2021160967 | A1 | * | 8/2021 | ............ B25J 9/0006 |
| WO | WO-2022227429 | A1 | * | 11/2022 | ........... G05D 1/0276 |

OTHER PUBLICATIONS

CN-118975917-A translation (Year: 2024).*
CN-106137687-A translation (Year: 2016).*
KR-20200122343-A translation (Year: 2020).*
CN-117260715-A translation (Year: 2023).*
CN-118593294-A translation (Year: 2024).*
Gait_Trajectory_and_Event_Prediction_from_State_Estimation_for_Exoskeletons_During_Gait2020 (Year: 2020).*
Trajectory_generation_and_control_of_a_lower_limb_exoskeleton_for_gait_assistance2022 (Year: 2022).*
WO-2022227429-A1 translation (Year: 2022).*
CN-116211654-A translation (Year: 2023).*
CN-118409504-A translation (Year: 2024).*

* cited by examiner

TRAJECTORY PLANNING METHOD FOR LOWER LIMB EXOSKELETON, CONTROL DEVICE AND COMPUTER-READABLE STORAGE MEDIUM

CROSS REFERENCE TO RELATED APPLICATIONS

This application claims priority to Chinese Patent Application No. CN 202410544336.8, filed Apr. 30, 2024, which is hereby incorporated by reference herein as if set forth in its entirety.

TECHNICAL FIELD

The present disclosure generally relates to robots, and in particular relates to a method and control device for trajectory planning for a lower limb exoskeleton and computer-readable storage medium.

BACKGROUND

For lower limb exoskeletons with full-joint assistance (hereinafter referred to as lower limb exoskeletons), an important issue is how to ensure stable walking control and prevent accidents such as tipping over. In other words, how to perform trajectory planning for the lower limb exoskeleton to ensure stable walking control is a technical problem that needs to be addressed in this field. Currently, when performing trajectory planning for lower limb exoskeletons, it is generally based on state-related phase variables, which often require reliance on multiple sensors. However, when sensors are lacking, it can affect the trajectory planning of the lower limb exoskeletons.

Therefore, there is a need to provide a trajectory planning method to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
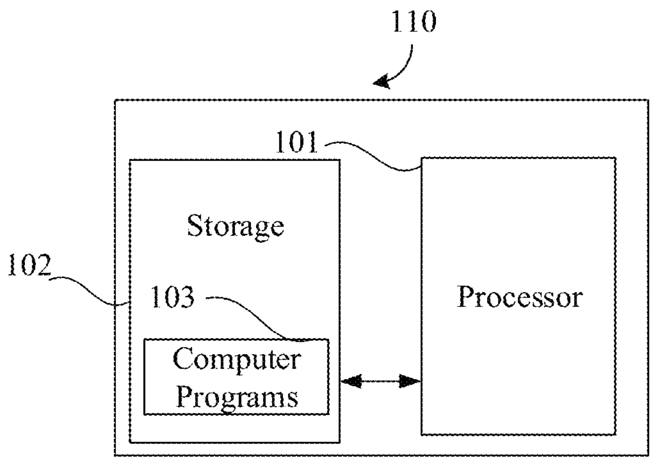
FIG. 1 is a schematic block diagram of a control device according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

For lower limb exoskeletons with full-joint assistance (hereinafter referred to as lower limb exoskeletons), an important issue is how to ensure stable walking control and prevent accidents such as tipping over. In other words, how to perform trajectory planning for the lower limb exoskeleton to ensure stable walking control is a technical problem that needs to be addressed in this field.

In general, the approach to solving this problem can refer to methods used in the bipedal robot field. For example, trajectory planning can be performed based on Hybrid Zero Dynamics (HZD). The concept of HZD was inspired by human walking planning and control, where the motion of the entire body's joints is scheduled based on a non-time-related phase variable. This phase variable must be strictly monotonically increasing during the single-leg support phase.

Specifically, the overall idea HZD can be outlined as follows: 1. Choose a function of the system states as the phase variable. For example, the ankle joint angle of the stance leg is commonly used, i.e., the angle between the stance leg's shin and the ground can be chosen as the phase variable. The ankle joint angle of the stance leg has been validated as strictly monotonically increasing in both humans and robots. 2. The motion trajectories of all degrees of freedom in the lower limbs can be described as curves related to the phase variable, such as commonly used Bezier curves, etc. In other words, all driven degrees of freedom can be designed as curves that change with the phase variable. Trajectory optimization can be performed using offline nonlinear optimization methods or modeling techniques like the Linear Inverted Pendulum (LIP) model. 3. Assume the human-robot rigid connection as a whole, considering the full dynamics as the controlled system. The designed trajectory curve is expressed as the system output. Virtual constraint control can make the system output asymptotically approach zero. When the system output equals zero, the controlled system is "reduced in dimension," and this state is referred to as "zero dynamics." The "hybrid zero dynamics" approach takes advantage of the symmetry of the robot's two legs. When the swing leg touches the ground, the system jumps from one state point to another on the zero dynamics manifold without exceeding this reduced-dimension manifold. This ensures that the hybrid system, which includes both continuous dynamics and discrete dynamics (such as state jumps during collisions), remains on the zero dynamics manifold under virtual constraint control. This control method is also known as Hybrid Zero Dynamics. The significance of considering zero dynamics lies in the fact that the orbital stability of the full-state system can be evaluated on the reduced-dimensional zero dynamics manifold.

However, when trajectory planning for the lower limb exoskeleton is based on HZD, it is generally carried out using state-related phase variables, which require the use of numerous sensors. These may include joint angle sensors for passive joints, six-degree-of-freedom force sensors on the foot, and others. When sensors are lacking and state-related phase variables cannot be obtained, it can affect the trajectory planning of the lower limb exoskeleton.

To address the above issue, the present disclosure provides a trajectory planning method for a lower limb exoskeleton, control device, and computer-readable storage medium. The method may include: determining a state space equation corresponding to the lower limb exoskeleton using dynamic analysis when planning trajectory for the lower limb exoskeleton; determining an objective function for trajectory planning of the lower limb exoskeleton according to the state space equation, wherein a phase variable corresponding to the objective function is only a time-related phase variable; and performing trajectory planning of the lower limb exoskeleton according to the objective function to obtain a first gait trajectory corresponding to the lower limb exoskeleton, wherein the first gait trajectory is a gait trajectory corresponding to the time-related phase variable. In other words, in the present disclosure, time-related phase variables are used for trajectory planning of the lower-limb exoskeleton, instead of state-related phase variables. This approach reduces the reliance on sensors for trajectory planning, ensures the accuracy of trajectory planning, and expands the potential applications of trajectory planning, offering strong ease of use and practicality.

Figure 2:
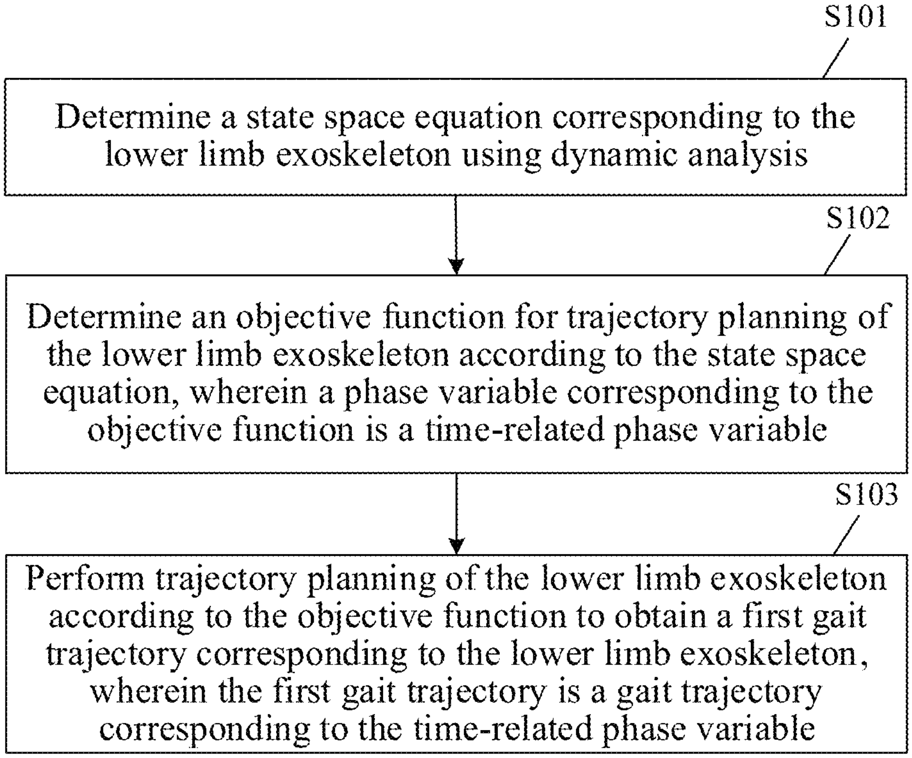
FIG. 2 is an exemplary flowchart of a trajectory planning method for a lower limb exoskeleton according to one embodiment.

FIG. 1 shows a schematic block diagram of a control device 110 according to one embodiment. The control device 110 can be a computer device independent of a lower limb exoskeleton. This computer device can be a personal computer, cloud server, laptop computer, or tablet computer. Alternatively, the control device 110 can be a hardware module integrated with the lower limb exoskeleton. In one embodiment, the control device 110 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of a trajectory planning method, such as steps S101 to S103 in FIG. 2 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the control device 110, such as a hard disk or a memory. The storage 102 may also be an external storage device of the control device 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the control device 110. The storage 102 can also be used to temporarily store data that have been output or is about to be output.

Figure 3:
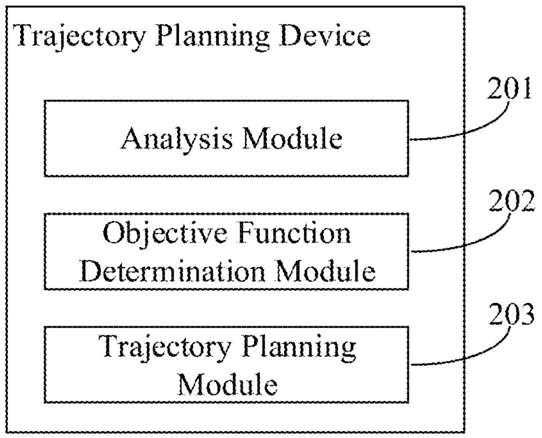
FIG. 3 is a schematic block diagram of a trajectory planning device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the control device 110. For example, the one or more computer programs 103 may be divided into an analysis module 201, an objective function determination module 202 and a trajectory planning module 203 as shown in FIG. 3.

It should be noted that the block diagram shown in FIG. 1 is only an example of the control device 110. The control device 110 may include more or fewer components than what is shown in FIG. 1, or have a different configuration than what is shown in FIG. 1. Each component shown in FIG. 1 may be implemented in hardware, software, or a combination thereof.

FIG. 2 is an exemplary flowchart of a trajectory planning method according to one embodiment. As an example, but not a limitation, the method can be implemented by the control device 110. The method may include the following steps.

Step S101: Determine a state space equation corresponding to the lower limb exoskeleton using dynamic analysis.

The lower limb exoskeleton is a hybrid system. That is, dynamic modeling and dynamic analysis of the lower limb exoskeleton can determine that the motion state of the lower limb exoskeleton can include the continuous dynamics during the single-leg support phase and the discrete dynamics during the transition between the left and right leg support phases.

It should be understood that the continuous dynamics can be obtained using the Lagrangian approach, which can be specifically expressed as: $M(q)\ddot{q}+C(q,\dot{q})\cdot\dot{q}+G(q)=B\cdot\tau$, where M represents the inertia matrix of the joint space, q represents the joint angle, $\dot{q}$ represents the joint angular velocity, $\ddot{q}$ represents the joint angular acceleration, C represents the first-order differential matrix related to the Coriolis force and the centripetal force, G represents the gravity-related matrix, B represents the variable linear transformation matrix from one rotation space to another, and $\tau$ is the joint driving torque.

The discrete dynamics can be derived using the conservation of momentum and angular momentum at the moment of collision, and can be specifically expressed as: $x^+=\Delta(x^-)$.

It should be understood that the discrete dynamics are triggered by the touchdown of the swing leg, and in the state, it can be expressed as the height of the lower limb exoskeleton's end being zero. In this state, a system state switching surface S can be defined. Therefore, the state space equation for the complete hybrid system can be expressed as:

$$\Sigma: \begin{cases} \dot{x} = f(x) + g(x)u, & x \notin S \\ x^+ = \Delta(x^-), & x \in S \end{cases}.$$

It should be noted that the state space equation of this hybrid system is compatible with lower-limb exoskeletons of various configurations and is applicable regardless of the number of actuated degrees of freedom.

Step S102: Determine an objective function for trajectory planning of the lower limb exoskeleton according to the state space equation, wherein a phase variable corresponding to the objective function is a time-related phase variable.

In one embodiment, after determining the state space equation corresponding to the lower limb exoskeleton, offline trajectory planning for the exoskeleton can be performed based on the state space equation. Specifically, when performing offline trajectory planning for the lower limb exoskeleton based on the state space equation, nonlinear optimization can be used for constructing the trajectory planning. That is, the original trajectory optimization problem (which can also be referred to as the original function or initial function) can be expressed as:

$$\min_{t_0,t_F,x(t),u(t)} J(t_0, t_F, x(t_0), x(t_F)) + \int_{t_0}^{t_F} w(\tau, x(\tau), u(\tau))d\tau,$$

where J(•) represents the boundary objectives, w(•) represents the path integrals along the entire trajectory, $t_0$ represents an initial time, $t_F$ represents a termination time, x(t) is a state variable at time t, that is, $x(t_0)$ is a state variables at time $t_0$, and $x(t_F)$ is a state variables at time $t_F$.

It should be understood that if the time for one gait cycle of the hybrid system has already been determined in advance, the decision variables for the termination time in the above equation can be omitted.

As can be seen from the above equation, the decision variables in the original trajectory optimization problem include infinite-dimensional continuous vector functions (i.e., path integrals w(•) along the entire trajectory), making the original trajectory optimization problem unsolvable. This embodiment of the present disclosure can approximate the constraints and the continuous vector functions in the original trajectory optimization problem using interpolation functions through the direct collocation method. This approach transforms the decision variables into state and control variables at several configuration points along the trajectory, making the original trajectory optimization problem a nonlinear optimization problem that can be solved using modern optimization tools.

For example, as can be seen from the expression of the original trajectory optimization problem above, the continuous vector function in the original trajectory optimization problem is related to the state variables (i.e., x(τ)) and control variables (i.e., u(τ)). Therefore, the state and control variables can be approximated using interpolation based on discrete points. For instance, the entire trajectory can be divided into N interpolation segments, with each segment constructed from three sampling points: the start point, midpoint, and endpoint of the segment. The endpoint of a segment serves as the start point for the next segment. Hence, there will be a total of 2N+1 sampling points along the entire trajectory, i.e.:

$$t_0, \cdots, t_k, t_{k+\frac{1}{2}}, t_{k+1}, \cdots, t_N.$$

The time length of each interpolation segment can be defined as: $h_k=t_{k+1}-t_k$. That is, the time length of each interpolation segment is the difference between the time corresponding to the endpoint and the time corresponding to the start point of the segment.

It should be noted that the sampling points connecting two interpolation segments can be referred to as nodes, while sampling points that exist only in one interpolation segment can be called midpoints. Both midpoints and nodes can be referred to as configuration points. That is, the start point, midpoint, and endpoint of each interpolation segment can all be referred to as configuration points. It should be understood that the interpolation function of the dynamics equation and the real function are exactly equal at these configuration points. Accordingly, the state variables and control variables can also be divided into 2N+1 sampling points, i.e.:

$$x_0, \cdots, x_k, x_{k+\frac{1}{2}}, x_{k+1}, \cdots, x_N; u_0, \cdots, u_k, u_{k+\frac{1}{2}}, u_{k+1}, \cdots, u_N,$$

where $x_0$ is a state variable at time $t_0$, $u_0$ is a control variable at time $t_0$, $x_k$ is a state variable at time $t_k$, $u_k$ is a control variable at time $$t_k, x_{k+\frac{1}{2}}$$

is a state variable at time $$t_{k+\frac{1}{2}}, x_{k+1}$$

is a state variable at time $$t_{k+1}, u_{k+\frac{1}{2}}$$

is a state variable at time $$t_{k+\frac{1}{2}}, u_{k+1}$$

is a control variable at time $t_{k+1}$, $x_N$ is a state variable at time $t_N$, $u_N$ is a control variable at time $t_N$.

After determining the sampling points on the trajectory, an interpolation function can be defined based on these points to approximate the original function. It should be understood that the property of the quadratic interpolation function is that its integral can be expressed using the function values at the start point, midpoint, and endpoint of the integration interval. Below, we will take a quadratic function $r(t)=a+bt+ct^2$ as an example to illustrate the derivation of the property that its integral can be represented by the function values at the start point, midpoint, and endpoint of the integration interval. The derivation process will use the interval of t as [0, h] as an example.

On the interval [0, h], the start point r(0), midpoint $$r\left(\frac{h}{2}\right),$$

and endpoint r(h) of the quadratic function can be represented as:

$$r(0) = a,\ r\left(\frac{h}{2}\right) = a + \frac{h}{2}b + \frac{h^2}{4}c,\ r(h) = a + bh + h^2c.$$

Therefore, it can be concluded that:

$$a=r(0),\ bh=-3r(0)+4r\left(\frac{h}{2}\right)-r(h),\ ch^2=2r(0)-4r\left(\frac{h}{2}\right)+2r(h).$$

The integral W of the quadratic function r(t) over the interval [0, h] can be expressed as:

$$W=\int_0^h (a+bt+ct^2)dt=ah+\frac{1}{2}bh^2+\frac{1}{3}ch^3=\frac{h}{6}\left(r(0)+4r\left(\frac{h}{2}\right)+r(h)\right).$$

In one embodiment, the integral of the state variables (i.e., the state variables from the start point to the endpoint of the interpolation segment) between two sampling points (e.g., the start point and the endpoint) within a certain interpolation segment of the hybrid system can be expressed as:

$$x_{k+1}-x_k=\int_{t_k}^{t_{k+1}} \dot{x}dt=\int_{t_k}^{t_{k+1}} f(x,u)dt.$$

As described above, the property of the quadratic interpolation function is that its integral can be represented by the function values at the start point, midpoint, and endpoint of the integration interval. Therefore, the integral of the state variables within a certain interpolation segment of the hybrid system, between two sampling points (e.g., the start point and the endpoint), can be expressed by the following equation:

$$x_{k+1}-x_k=\frac{1}{6}h_k\left(f(x_k,u_k)+4f\left(x_{k+\frac{1}{2}},u_{k+\frac{1}{2}}\right)+f(x_{k+1},u_{k+1})\right)$$

(hereinafter referred to as equation (1)), where $x_k$ is a state variable at time $t_k$, time $t_k$ can correspond to the time of the start point of the interpolation segment, $$x_{k+\frac{1}{2}}$$

is a state variable at time $$t_{k+\frac{1}{2}},$$

time $$t_{k+\frac{1}{2}}$$

can correspond to the time of the midpoint of the interpolation segment, $x_{k+1}$ is a state variable at time $t_{k+1}$, time $t_{k+1}$ can correspond to the time of the termination point of the interpolation segment. In other words, the left side of the above equation represents the difference between the starting and terminal state variables within the interpolation segment. The right side of the equation represents the estimated integral value using the derivatives of the state variables at the three sampling points within the interpolation segment. It should be understood that both sides of the above equation are intended to be approximately equal, but for the purposes of solving the nonlinear optimization, they can be written as an exact equality.

In one embodiment, the decision variable $$x_{k+\frac{1}{2}}$$

to be optimized in the above equation, along with the state variables at the start and termination points of the interpolation segment, can satisfy the constraint relationship represented by the following equation (hereinafter referred to as equation (2)):

$$x_{k+\frac{1}{2}}=\frac{1}{2}(x_k+x_{k+1})+\frac{h_k}{8}(f(x_k,u_k)-f(x_{k+1},u_{k+1})).$$

It should be understood that the above equations (1) and formula (2) can serve as the system dynamics constraints based on the discretized decision variables.

For example, based on the property of the quadratic interpolation function, where its integral can be expressed using the function values at the start point, midpoint, and end point of the integration interval, a similar approach can be applied to the continuous vector function in the original trajectory optimization problem. For example, let: $w(t)=u(t)^T \cdot R \cdot u(t)$, where T represents a transpose, and R represents a preset penalty term. R can be determined according to the specific scenario, and the present disclosure does not impose any limitations on this.

Therefore, the integral of the continuous vector function over the entire gait cycle in the original trajectory optimization problem can be expressed as:

$$\int_{t_0}^{t_F} w(t)dt \approx \sum_{k=0}^{N-1}\frac{h_k}{6}\left(w_k+4w_{k+\frac{1}{2}}+w_{k+1}\right).$$

Based on this, optimizing the original trajectory optimization problem ultimately leads to the transformed nonlinear trajectory planning problem (which hereinafter may be referred to as the objective function). In this case, the objective function is a function corresponding to the phase variable that is solely time-related. That is, the state variables and control variables in the objective function can be solely time-related. Specifically, the objective function can be expressed as:

$$\min_{t_0,t_F,x_1\ldots x_N,u_1\ldots u_N} J(t_0,t_F,x(t_0),x(t_F))+\sum_{k=0}^{N-1}\frac{h_k}{6}\left(w_k+4w_{k+\frac{1}{2}}+w_{k=1}\right);$$

$$x_{k+1}-x_k=\int_{t_k}^{t_{k+1}}\dot{x}dt=$$

$$\int_{t_k}^{t_{k+1}} f(x,u)dt=\frac{h_k}{6}\left(f(x_k,u_k)+4f\left(x_{k+\frac{1}{2}},u_{k+\frac{1}{2}}\right)+f(x_{k+1},u_{k+1})\right);$$

$$x_{k+\frac{1}{2}}=\frac{1}{2}(x_k+x_{k+1})+\frac{h_k}{8}(f(x_k,u_k)-f(x_{k+1},u_{k+1}));$$

$$x_0=\Delta(x_F).$$

It should be noted that the transformed nonlinear trajectory planning problem described above can be solved using existing nonlinear solvers, and the present disclosure places no specific restrictions on the solving process.

Step S103: Perform trajectory planning of the lower limb exoskeleton according to the objective function to obtain a first gait trajectory corresponding to the lower limb exoskeleton, wherein the first gait trajectory is a gait trajectory corresponding to the time-related phase variable.

In one embodiment, the trajectory of the lower-limb exoskeleton can be planned based on the above-mentioned objective function to obtain the corresponding first gait trajectory. The first gait trajectory can be the gait trajectory corresponding to the time-related phase variable. That is, the state variables determined based on the above objective function can be state variables that change only with time, which is different from the state variables in the prior art that change with both time and control variables. Similarly, the control variables determined based on the above objective function can also be control variables that change only with time, which differs from the control variables in the prior art that change with both time and state variables. This allows the gait trajectory of the lower-limb exoskeleton to be determined solely based on the time-related phase variable, reducing reliance on sensors and ensuring the accurate determination of the gait trajectory for the lower-limb exoskeleton.

In one embodiment, the first gait trajectory can be a discrete gait trajectory. That is, the control variables determined based on the above objective function can be discrete control variables, and the state variables determined based on the above objective function can be discrete state variables. Therefore, to accurately obtain the gait trajectory of the lower-limb exoskeleton, after obtaining the first gait trajectory, the discrete control variables and discrete state variables can be processed (e.g., interpolation can be performed) to obtain continuous control variables and continuous state variables, thus obtaining a continuous gait trajectory (which can be referred to as the second gait trajectory).

In one embodiment, for each interpolation segment, a local time variable within the segment can be denoted as $\tau = t - t_k$. Here, t is the time variable within the interpolation segment. Subsequently, each interpolation segment can undergo interpolation processing to obtain the continuous gait trajectory corresponding to each interpolation segment. Based on the continuous gait trajectory corresponding to each interpolation segment, the second gait trajectory of the lower-limb exoskeleton can be obtained.

For each interpolation segment, the discrete control variables can be processed using the following equation, that is, the reconstruction of the control variables can be expressed as:

$$u(t) = \frac{2}{{h_k}^2} \cdot \left( u_k \cdot (\tau - h_k)\left(\tau - \frac{h_k}{2}\right) - 2u_{k+\frac{1}{2}} \cdot \tau(\tau - h_k) + u_{k+1} \cdot \tau\left(\tau - \frac{h_k}{2}\right)\right).$$

For the dynamic equations, the derivative of the discrete state variables can be processed using the following equation, that is, the reconstruction of the derivative of the state variables can be expressed as:

$$\dot{x}(t) = f(x(t), u(t)) = \frac{2}{{h_k}^2}\left( f(x_k, u_k) \cdot \left(\tau - \frac{h_k}{2}\right)(\tau - h_k) - \right.$$

-continued $$\left. f\left(x_{k+\frac{1}{2}}, u_{k+\frac{1}{2}}\right) \cdot 2\tau(\tau - h_k) + f_{k+1} \cdot \tau\left(\tau - \frac{h_k}{2}\right)\right).$$

Therefore, for each interpolation segment, the discrete state variables can be processed using the following equation (hereinafter referred to as equation (3)) to obtain continuous state variables (i.e., continuous gait trajectory), and the continuous gait trajectory can be obtained by integrating the dynamic equations:

$$x(t) = \int_0^t \dot{x}(\tau) d\tau = x_k + \left( \begin{array}{c} f(x_k, u_k) \cdot \frac{\tau}{h_k} + \frac{1}{2}\left(-3f(x_k, u_k) + 4f\left(x_{k+\frac{1}{2}}, u_{k+\frac{1}{2}}\right) - \right. \\ \left. f(x_{k+1}, u_{k+1})\right) \cdot \left(\frac{\tau}{h_k}\right)^2 + \\ \frac{1}{3}\left(2f(x_k, u_k) - 4f\left(x_{k+\frac{1}{2}}, u_{k+\frac{1}{2}}\right) + 2f(x_{k+1}, u_{k+1})\right) \cdot \left(\frac{\tau}{h_k}\right)^3 \end{array} \right) \cdot h_k.$$

The continuous gait trajectory described above can be used to obtain a second gait trajectory for real-time stable walking planning. The second gait trajectory can be the gait trajectory corresponding to the time-related phase variable.

It should be noted that during the control phase, the lower-limb exoskeleton still needs to be controlled using state-related phase variables. Therefore, in the control phase of the lower-limb exoskeleton, the conversion between time-related phase variables and state-related phase variables can be performed to transform the time-related gait trajectory into a state-related gait trajectory. This allows the lower-limb exoskeleton to be controlled based on the state-related gait trajectory.

In one embodiment, the offline planned gait trajectory (e.g., the offline planned state variables) can be a function of the phase variable $\gamma$. Both time-related phase variables and state-related phase variables can be converted to the same phase variable $\gamma$. That is, $\gamma = P_t(t)$, $x_{plan} = x_{plan} \circ P_t(t) = x_{plan}(\gamma)$, where $P_t(t)$ is a time-related phase variable, and $\circ$ is a composite function.

Therefore, the feedback state variable $P_x$ obtained from the time-related phase variable can be expressed as: $P_x = P_x(\gamma) = P_x \circ P_t(t) = P_x(P_t(t))$, where the functions $P_t$ and $P_x$ are both monotonically increasing, meaning that both functions $P_t$ and $P_x$ have inverse functions.

It should be understood that the feedback state variable obtained based on the time-related phase variable can be determined according to the time-related phase variable and the above equation (3) (i.e., the equation for determining the second gait trajectory).

Therefore, during the movement of the lower-limb exoskeleton, after obtaining the feedback state variable $P_x$ based on the time-related phase variable, the phase variable $\gamma$ can be derived from the feedback state variable $P_x$. The derived phase variable can be expressed as: $\gamma = P_x^{-1}(P_x)$.

It should be noted that since the feedback state variable determined based on the time-related phase variable is the same as the feedback state variable determined based on the state-related phase variable, after determining the feedback state variable based on the time-related phase variable and deriving the phase variable $\gamma$ from the feedback state variable, the state-related phase variable can be derived from the derived phase variable. In other words, the gait trajectory $x_{plan}$ (which can be referred to as the third gait trajectory)

planned based on the state-related phase variable $\gamma$ can be expressed by the following equation (4): $x_{plan}=x_{plan}(P_x^{-1}(P_x))$; $P_x=P_x(P_t(t))$.

In one embodiment, after obtaining the third gait trajectory, the lower-limb exoskeleton can be controlled based on the third gait trajectory.

In summary, the trajectory planning method may include: determining a state space equation corresponding to the lower limb exoskeleton using dynamic analysis when planning trajectory for the lower limb exoskeleton; determining an objective function for trajectory planning of the lower limb exoskeleton according to the state space equation, wherein a phase variable corresponding to the objective function is a time-related phase variable; and performing trajectory planning of the lower limb exoskeleton according to the objective function to obtain a first gait trajectory corresponding to the lower limb exoskeleton, wherein the first gait trajectory is a gait trajectory corresponding to the time-related phase variable. In other words, in the present disclosure, time-related phase variables are used for trajectory planning of the lower-limb exoskeleton. This approach reduces the reliance on sensors for trajectory planning, ensures the accuracy of trajectory planning, and expands the potential applications of trajectory planning, offering strong ease of use and practicality.

It should be understood that sequence numbers of the foregoing processes do not mean an execution sequence in the above-mentioned embodiments. The execution sequence of the processes should be determined according to functions and internal logic of the processes, and should not be construed as any limitation on the implementation processes of the above-mentioned embodiments.

Corresponding to the trajectory planning method for the lower-limb exoskeleton described above, FIG. 3 illustrates a block diagram of a trajectory planning device for the lower-limb exoskeleton according to one embodiment. For the sake of clarity, only the parts relevant to the present embodiment are shown. In one embodiment, the method may include an analysis module 201, an objective function determination module 202 and a trajectory planning module 203.

The analysis module 201 is to determine a state space equation corresponding to the lower limb exoskeleton using dynamic analysis. The objective function determination module 202 is to determine an objective function for trajectory planning of the lower limb exoskeleton according to the state space equation. The phase variable corresponding to the objective function is a time-related phase variable. The trajectory planning module 203 is to perform trajectory planning of the lower limb exoskeleton according to the objective function to obtain a first gait trajectory corresponding to the lower limb exoskeleton. The first gait trajectory is a gait trajectory corresponding to the time-related phase variable.

In one embodiment, the objective function determination module 202 is further to: determine an initial function for trajectory planning of the lower limb exoskeleton according to the state space equation, wherein the initial function includes boundary objectives and path integrals along the entire trajectory; split the entire trajectory into N interpolation segments, and determining a time length for each of the interpolation segments, wherein each of the interpolation segments comprises a start point, a midpoint and an end point; for each interpolation segment of the interpolation segments, determine an integral of state variables in the interpolation segment between the start point and the end point of the interpolation segment according to the time length of the interpolation segment, the start point of the interpolation segment, the midpoint of the interpolation segment and the end point of the interpolation segment, and determine a constraint relationship between the state variable at the midpoint of the interpolation segment, the state variable at the start point, and the state variable at the end point of the segment; and determine the objective function according to the boundary objectives, an integral of each of the N interpolation segments and the constraint relationship.

In one embodiment, the objective function is expressed as follows:

$$\min_{t_0,t_F,x_1\ldots x_N,u_1\ldots u_N} J(t_0, t_F, x(t_0), x(t_F)) + \sum_{k=0}^{N-1} \frac{h_k}{6}\left(w_k + 4w_{k+\frac{1}{2}} + w_{k+1}\right);$$

$$h_k = t_{k+1} - t_k;$$

$$w_k = w(t_k),\ w_{k+\frac{1}{2}} = w\left(t_{k+\frac{1}{2}}\right),\ w_{k+1} = w(t_{k+1});$$

$$w(t) = u(t)^T \cdot R \cdot u(t);$$

$$x_{k+1} - x_k = \int_{t_k}^{t_{k+1}} \dot{x}dt = \int_{t_k}^{t_{k+1}} f(x, u)dt = \frac{h_k}{6}\left(f(x_k, u_k) + 4f\left(x_{k+\frac{1}{2}}, u_{k+\frac{1}{2}}\right) + f(x_{k+1}, u_{k+1})\right);$$

$$x_{k+\frac{1}{2}} = \frac{1}{2}(x_k + x_{k+1}) + \frac{h_k}{8}(f(x_k, u_k) - f(x_{k+1}, u_{k+1}));$$

$$x_0 = \Delta(x_F);$$

where J(•) represents the boundary objectives, w(•) represents the path integrals along the entire trajectory, $t_0$ represents an initial time, $t_F$ represents a termination time, $x(t_0)$ and $x_0$ are state variables at time $t_0$, $x(t_F)$ and $x_F$ are state variables at time $t_F$, $x_i$ is a state variable at time $t_i$, $u_i$ is a control variable at time $t_i$, $1 \le i \le N$, N is a number of the interpolation segments into which the entire trajectory is divided, and $h_k$ represents a time length of one of the interpolation segments.

In one embodiment, the first gait trajectory is a discrete gait trajectory. The device may further include a processing module. The processing module is to process each interpolation segment in the first gait trajectory to obtain a continuous gait trajectory corresponding to each interpolation segment in the first gait trajectory. The trajectory planning module 203 is to, based on the continuous gait trajectory corresponding to each interpolation segment in the first gait trajectory, obtain a second gait trajectory for the lower limb exoskeleton, wherein the second gait trajectory is a continuous gait trajectory.

In one embodiment, each interpolation segment in the first gait trajectory is processed using the following equations:

$$x(t) = \int_0^t \dot{x}(\tau)d\tau = x_k + \left(\begin{array}{c} f(x_k, u_k)\cdot\frac{\tau}{h_k} + \frac{1}{2}\left(-3f(x_k, u_k) + 4f\left(x_{k+\frac{1}{2}}, u_{k+\frac{1}{2}}\right) - f(x_{k+1}, u_{k+1})\right)\cdot\left(\frac{\tau}{h_k}\right)^2 + \\ \frac{1}{3}\left(2f(x_k, u_k) - 4f\left(x_{k+\frac{1}{2}}, u_{k+\frac{1}{2}}\right) + 2f(x_{k+1}, u_{k+1})\right)\cdot\left(\frac{\tau}{h_k}\right)^3 \end{array}\right)\cdot h_k;$$

$\tau = t - t_k$; and

-continued $$h_k = t_{k+1} - t_k;$$

where x(t) is the continuous gait trajectory corresponding to an interpolation segment, $x_k$ is a state variable at time $$t_k, x_{k+\frac{1}{2}}$$

is a state variable at time $$t_{k+\frac{1}{2}}, x_{k+1}$$

is a state variable at time $t_{k+1}$, $u_k$ is a control variable at time $$t_k, u_{k+\frac{1}{2}}$$

is a state variable at time $$t_{k+\frac{1}{2}}, u_{k+1}$$

is a control variable at time $t_{k+1}$, $h_k$ is a time length of the interpolation segment, and t is a time variable.

In one embodiment, the device may further include a gait conversion module and a control module. The gait conversion module is to convert the second gait trajectory into a third gait trajectory using a preset conversion equation. The third gait trajectory is a gait trajectory corresponding to a state-related phase variable. The control module is to control the lower limb exoskeleton according to the third gait trajectory.

In one embodiment, the preset conversion equation is as follows:

$$x_{plan} = x_{plan}(P_x^{-1}(P_x));$$

$$P_x = P_x(P_t(t));$$

where $x_{plan}$ is the third gait trajectory, $P_t(t)$ is a time-related phase variable, $P_x$ is a feedback state variable determined based on the time-related phase variable, and the feedback state variable $P_x$ is determined based on the time-related phase variable and the second gait trajectory.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented trajectory planning method for a lower limb exoskeleton, the method comprising:

determining a state space equation corresponding to the lower limb exoskeleton using dynamic analysis;

determining an objective function for trajectory planning of the lower limb exoskeleton according to the state space equation, wherein a phase variable corresponding to the objective function is a time-related phase variable; and performing trajectory planning of the lower limb exoskeleton according to the objective function to obtain a first gait trajectory corresponding to the lower limb exoskeleton, wherein the first gait trajectory is a gait trajectory corresponding to the time-related phase variable;

wherein the first gait trajectory is a discrete gait trajectory, and the method further comprises, after performing trajectory planning of the lower limb exoskeleton according to the objective function to obtain the first gait trajectory corresponding to the lower limb exoskeleton, processing each interpolation segment in the first gait trajectory to obtain a continuous gait trajectory corresponding to each interpolation segment in the first gait trajectory; and based on the continuous gait trajectory corresponding to each interpolation segment in the first gait trajectory, obtaining a second gait trajectory for the lower limb exoskeleton, wherein the second gait trajectory is a continuous gait trajectory; and wherein the method further comprises, after obtaining the second gait trajectory for the lower limb exoskeleton, converting the second gait trajectory into a third gait trajectory using a preset conversion equation, wherein the third gait trajectory is a gait trajectory corresponding to a state-related phase variable; and controlling the lower limb exoskeleton according to the third gait trajectory.

2. The method of claim 1, wherein determining the objective function for trajectory planning of the lower limb exoskeleton according to the state space equation comprises:

determining an initial function for trajectory planning of the lower limb exoskeleton according to the state space equation, wherein the initial function comprises boundary objectives and path integrals along the entire trajectory;

splitting the entire trajectory into N interpolation segments, and determining a time length for each of the interpolation segments, wherein each of the interpolation segments comprises a start point, a midpoint and an end point;

for each interpolation segment of the interpolation segments, determining an integral of state variables in the interpolation segment between the start point and the end point of the interpolation segment according to the time length of the interpolation segment, the start point of the interpolation segment, the midpoint of the interpolation segment and the end point of the interpolation segment, and determining a constraint relationship between the state variable at the midpoint of the interpolation segment, the state variable at the start point, and the state variable at the end point of the segment; and determining the objective function according to the boundary objectives, an integral of each of the N interpolation segments and the constraint relationship.

3. The method of claim 2, wherein the objective function is expressed as follows:

$$\min_{t_0, t_F, x_1 \ldots x_N, u_1 \ldots u_N} J(t_0, t_F, x(t_0), x(t_F)) + \sum_{k=0}^{N-1} \frac{h_k}{6}\left(w_k + 4w_{k+\frac{1}{2}} + w_{k+1}\right);$$

$$h_k = t_{k+1} - t_k;$$

$$w_k = w(t_k),\ w_{k+\frac{1}{2}} = w\left(t_{k+\frac{1}{2}}\right),\ w_{k+1} = w(t_{k+1});$$

$$w(t) = u(t)^T \cdot R \cdot u(t);$$

$$x_{k+1} - x_k = \int_{t_k}^{t_{k+1}} \dot{x}\,dt = \int_{t_k}^{t_{k+1}} f(x, u)dt = \frac{h_k}{6}\left(f(x_k, u_k) + 4f\left(x_{k+\frac{1}{2}}, u_{k+\frac{1}{2}}\right) + f(x_{k+1}, u_{k+1})\right);$$

$$x_{k+\frac{1}{2}} = \frac{1}{2}(x_k + x_{k+1}) + \frac{h_k}{8}(f(x_k, u_k) - f(x_{k+1}, u_{k+1}));$$

$$x_0 = \Delta(x_F);$$

where J(•) represents the boundary objectives, w(•) represents the path integrals along the entire trajectory, $t_0$ represents an initial time, $t_F$ represents a termination time, $x(t_0)$ and $x_0$ are state variables at time $t_0$, $x(t_F)$ and $x_F$ are state variables at time $t_F$, $x_i$ is a state variable at time $t_i$, $u_i$ is a control variable at time $t_i$, $1 \leq i \leq N$, N is a number of the interpolation segments into which the entire trajectory is divided, R represents a preset penalty term, and $h_k$ represents a time length of one of the interpolation segments.

4. The method of claim 1, wherein each interpolation segment in the first gait trajectory is processed using the following equations:

$$x(t) = \int_0^t \dot{x}(\tau)d\tau = x_k + \left(\begin{array}{c} f(x_k, u_k)\cdot\frac{\tau}{h_k} + \frac{1}{2}\left(-3f(x_k, u_k) + 4f\left(x_{k+\frac{1}{2}}, u_{k+\frac{1}{2}}\right) - f(x_{k+1}, u_{k+1})\right)\cdot\left(\frac{\tau}{h_k}\right)^2 + \\ \frac{1}{3}\left(2f(x_k, u_k) - 4f\left(x_{k+\frac{1}{2}}, u_{k+\frac{1}{2}}\right) + 2f(x_{k+1}, u_{k+1})\right)\cdot\left(\frac{\tau}{h_k}\right)^3 \end{array}\right)\cdot h_k;$$

$$\tau = t - t_k; \text{ and}$$

$$h_k = t_{k+1} - t_k;$$

where x(t) is the continuous gait trajectory corresponding to an interpolation segment, $x_k$ is a state variable at time $$t_k,\ x_{k+\frac{1}{2}}$$

is a state variable at time $$t_{k+\frac{1}{2}},\ x_{k+1}$$

is a state variable at time $t_{k+1}$, $u_k$ is a control variable at time $$t_k,\ u_{k+\frac{1}{2}}$$

is a state variable at time $$t_{k+\frac{1}{2}},\ u_{k+1}$$

is a control variable at time $t_{k+1}$, $h_k$ is a time length of the interpolation segment, and t is a time variable.

5. The method of claim 1, wherein the preset conversion equation is as follows:

$$x_{plan} = x_{plan}\left(P_x^{-1}(P_x)\right);$$

$$P_x = P_x(P_t(t));$$

where $x_{plan}$ is the third gait trajectory, $P_t(t)$ is a time-related phase variable, $P_x$ is a feedback state variable determined based on the time-related phase variable, and the feedback state variable $P_x$ is determined based on the time-related phase variable and the second gait trajectory.

6. A control device comprising:

one or more processors; and a memory coupled to the one or more processors, the memory storing programs that, when executed by the one or more processors, cause performance of operations comprising:

determining a state space equation corresponding to a lower limb exoskeleton using dynamic analysis;

determining an objective function for trajectory planning of the lower limb exoskeleton according to the state space equation, wherein a phase variable corresponding to the objective function is a time-related phase variable; and performing trajectory planning of the lower limb exoskeleton according to the objective function to obtain a first gait trajectory corresponding to the lower limb exoskeleton, wherein the first gait trajectory is a gait trajectory corresponding to the time-related phase variable;

wherein the first gait trajectory is a discrete gait trajectory, and the operations further comprise, after performing trajectory planning of the lower limb exoskeleton according to the objective function to obtain the first gait trajectory corresponding to the lower limb exoskeleton, processing each interpolation segment in the first gait trajectory to obtain a continuous gait trajectory corresponding to each interpolation segment in the first gait trajectory; and based on the continuous gait trajectory corresponding to each interpolation segment in the first gait trajectory, obtaining a second gait trajectory for the lower limb exoskeleton, wherein the second gait trajectory is a continuous gait trajectory; and wherein the operations further comprise, after obtaining the second gait trajectory for the lower limb exoskeleton, converting the second gait trajectory into a third gait trajectory using a preset conversion equation, wherein the third gait trajectory is a gait trajectory corresponding to a state-related phase variable; and controlling the lower limb exoskeleton according to the third gait trajectory.

7. The control device of claim 6, wherein determining the objective function for trajectory planning of the lower limb exoskeleton according to the state space equation comprises:

determining an initial function for trajectory planning of the lower limb exoskeleton according to the state space equation, wherein the initial function comprises boundary objectives and path integrals along the entire trajectory;

splitting the entire trajectory into N interpolation segments, and determining a time length for each of the interpolation segments, wherein each of the interpolation segments comprises a start point, a midpoint and an end point;

for each interpolation segment of the interpolation segments, determining an integral of state variables in the interpolation segment between the start point and the end point of the interpolation segment according to the time length of the interpolation segment, the start point of the interpolation segment, the midpoint of the interpolation segment and the end point of the interpolation segment, and determining a constraint relationship between the state variable at the midpoint of the interpolation segment, the state variable at the start point, and the state variable at the end point of the segment; and determining the objective function according to the boundary objectives, an integral of each of the N interpolation segments and the constraint relationship.

8. The control device of claim 7, wherein the objective function is expressed as follows:

$$\min_{t_0,t_F,x_1\ldots x_N,u_1\ldots u_N} J(t_0, t_F, x(t_0), x(t_F)) + \sum_{k=0}^{N-1} \frac{h_k}{6}\left(w_k + 4w_{k+\frac{1}{2}} + w_{k+1}\right);$$

$$h_k = t_{k+1} - t_k;$$

$$w_k = w(t_k),\ w_{k+\frac{1}{2}} = w\left(t_{k+\frac{1}{2}}\right),\ w_{k+1} = w(t_{k+1});$$

$$w(t) = u(t)^T \cdot R \cdot u(t);$$

$$x_{k+1} - x_k = \int_{t_k}^{t_{k+1}} \dot{x}dt = \int_{t_k}^{t_{k+1}} f(x, u)dt = \frac{h_k}{6}\left(f(x_k, u_k) + 4f\left(x_{k+\frac{1}{2}}, u_{k+\frac{1}{2}}\right) + f(x_{k+1}, u_{k+1})\right);$$

$$x_{k+\frac{1}{2}} = \frac{1}{2}(x_k + x_{k+1}) + \frac{h_k}{8}(f(x_k, u_k) - f(x_{k+1}, u_{k+1}));$$

$$x_0 = \Delta(x_F);$$

where J(•) represents the boundary objectives, w(•) represents the path integrals along the entire trajectory, to represents an initial time, $t_F$ represents a termination time, $x(t_0)$ and $x_0$ are state variables at time $t_0$, $x(t_F)$ and $x_F$ are state variables at lime $t_F$, $x_i$ is a state variable at time $t_i$, $u_i$ is a control variable at time $t_i$, $1 \le i \le N$, N is a number of the interpolation segments into which the entire trajectory is divided, R represents a preset penalty term, and $h_k$ represents a time length of one of the interpolation segments.

9. The control device of claim 6, wherein each interpolation segment in the first gait trajectory is processed using the following equations:

$$x(t) = \int_0^t \dot{x}(\tau)d\tau = x_k + \left(\begin{array}{l} f(x_k, u_k) \cdot \frac{\tau}{h_k} + \frac{1}{2}\left(-3f(x_k, u_k) + 4f\left(x_{k+\frac{1}{2}}, u_{k+\frac{1}{2}}\right) - f(x_{k+1}, u_{k+1})\right) \cdot \\ \left(\frac{\tau}{h_k}\right)^2 + \frac{1}{3}\left(2f(x_k, u_k) - 4f\left(x_{k+\frac{1}{2}}, u_{k+\frac{1}{2}}\right) + 2f(x_{k+1}, u_{k+1})\right) \cdot \left(\frac{\tau}{h_k}\right)^2 \end{array}\right) \cdot h_k;$$

$$\tau = t - t_k; \text{ and}$$

$$h_k = t_{k+1} - t_k;$$

where x(t) is the continuous gait trajectory corresponding to an interpolation segment, $x_k$ is a state variable at time $$t_k,\ x_{k+\frac{1}{2}}$$

is a state variable at time $$t_{k+\frac{1}{2}},\ x_{k+1}$$

is a state variable at time $t_{k+1}$, $u_k$ is a control variable at time $$t_k,\ u_{k+\frac{1}{2}}$$

is a state variable at time $$t_{k+\frac{1}{2}},\ u_{k+1}$$

is a control variable at time $t_{k+1}$, $h_k$ is a time length of the interpolation segment, and t is a time variable.

10. The control device of claim 6, wherein the preset conversion equation is as follows:

$$x_{plan} = x_{plan}\left(P_x^{-1}(P_x)\right);$$

$$P_x = P_x(P_t(t));$$

where $x_{plan}$ is the third gait trajectory, $P_t(t)$ is a time-related phase variable, $P_x$ is a feedback state variable determined based on the time-related phase variable, and the feedback state variable $P_x$ is determined based on the time-related phase variable and the second gait trajectory.

11. A non-transitory computer-readable storage medium storing instructions that, when executed by at least one processor of a control device, cause the at least one processor to perform a method, the method comprising:

determining a state space equation corresponding to a lower limb exoskeleton using dynamic analysis;

determining an objective function for trajectory planning of the lower limb exoskeleton according to the state space equation, wherein a phase variable corresponding to the objective function is a time-related phase variable; and performing trajectory planning of the lower limb exoskeleton according to the objective function to obtain a first gait trajectory corresponding to the lower limb exoskeleton, wherein the first gait trajectory is a gait trajectory corresponding to the time-related phase variable;

wherein the first gait trajectory is a discrete gait trajectory, and the method further comprises, after performing trajectory planning of the lower limb exoskeleton according to the objective function to obtain the first gait trajectory corresponding to the lower limb exoskeleton, processing each interpolation segment in the first gait trajectory to obtain a continuous gait trajectory corresponding to each interpolation segment in the first gait trajectory; and based on the continuous gait trajectory corresponding to each interpolation segment in the first gait trajectory, obtaining a second gait trajectory for the lower limb exoskeleton, wherein the second gait trajectory is a continuous gait trajectory; and wherein the method further comprises, after obtaining the second gait trajectory for the lower limb exoskeleton, converting the second gait trajectory into a third gait trajectory using a preset conversion equation, wherein the third gait trajectory is a gait trajectory corresponding to a state-related phase variable; and controlling the lower limb exoskeleton according to the third gait trajectory.

12. The non-transitory computer-readable storage medium of claim 11, wherein determining the objective function for trajectory planning of the lower limb exoskeleton according to the state space equation comprises:

determining an initial function for trajectory planning of the lower limb exoskeleton according to the state space equation, wherein the initial function comprises boundary objectives and path integrals along the entire trajectory;

splitting the entire trajectory into N interpolation segments, and determining a time length for each of the interpolation segments, wherein each of the interpolation segments comprises a start point, a midpoint and an end point;

for each interpolation segment of the interpolation segments, determining an integral of state variables in the interpolation segment between the start point and the end point of the interpolation segment according to the time length of the interpolation segment, the start point of the interpolation segment, the midpoint of the interpolation segment and the end point of the interpolation segment, and determining a constraint relationship between the state variable at the midpoint of the interpolation segment, the state variable at the start point, and the state variable at the end point of the segment; and determining the objective function according to the boundary objectives, an integral of each of the N interpolation segments and the constraint relationship.

13. The non-transitory computer-readable storage medium of claim 12, wherein the objective function is expressed as follows:

$$\min_{t_0,t_F,x_1\ldots x_N,u_1\ldots u_N} J(t_0, t_F, x(t_0), x(t_F)) + \sum_{k=0}^{N-1}\frac{h_k}{6}\left(w_k + 4w_{k+\frac{1}{2}} + w_{k+1}\right);$$

$$h_k = t_{k+1} - t_k;$$

$$w_k = w(t_k),\ w_{k+\frac{1}{2}} = w\left(t_{k+\frac{1}{2}}\right),\ w_{k+1} = w(t_{k+1});$$

$$w(t) = u(t)^T \cdot R \cdot u(t);$$

$$x_{k+1} - x_k = \int_{t_k}^{t_{k+1}} \dot{x}dt = \int_{t_k}^{t_{k+1}} f(x, u)dt = \frac{h_k}{6}\left(f(x_k, u_k) + 4f\left(x_{k+\frac{1}{2}}, u_{k+\frac{1}{2}}\right) + f(x_{k+1}, u_{k+1})\right);$$

$$x_{k+\frac{1}{2}} = \frac{1}{2}(x_k + x_{k+1}) + \frac{h_k}{8}(f(x_k, u_k) - f(x_{k+1}, u_{k+1}));$$

$$x_0 = \Delta(x_F);$$

where J(•) represents the boundary objectives, w(•) represents the path integrals along the entire trajectory, $t_0$ represents an initial time, $t_F$ represents a termination time, $x(t_0)$ and $x_0$ are state variables at time $t_0$, $x(t_F)$ and $x_F$ are state variables at time $t_F$, $x_i$ is a state variable at time $t_i$, $u_t$ is a control variable at time $t_i$, $1 \le i \le N$, N is a number of the interpolation segments into which the entire trajectory is divided, R represents a preset penalty term, and $h_k$ represents a time length of one of the interpolation segments.

14. The non-transitory computer-readable storage medium of claim 11, wherein each interpolation segment in the first gait trajectory is processed using the following equations:

$$x(t) = \int_0^{\tau} \dot{x}(\tau)d\tau = x_k + \left( \begin{array}{l} f(x_k, u_k)\cdot\frac{\tau}{h_k} + \frac{1}{2}\left(-3f(x_k, u_k) + 4f\left(x_{k+\frac{1}{2}}, u_{k+\frac{1}{2}}\right) - f(x_{k+1}, u_{k+1})\right)\cdot \\ \left(\frac{\tau}{h_k}\right)^2 + \frac{1}{3}\left(2f(x_k, u_k) - 4f\left(x_{k+\frac{1}{2}}, u_{k+\frac{1}{2}}\right) + 2f(x_{k+1}, u_{k+1})\right)\cdot\left(\frac{\tau}{h_k}\right)^2 \end{array} \right)\cdot h_k;$$

$$\tau = t - t_k; \text{ and}$$

$$h_k = t_{k+1} - t_k;$$

where x(t) is the continuous gait trajectory corresponding to an interpolation segment, $x_k$ is a state variable at time $$t_k, x_{k+\frac{1}{2}}$$

is a state variable at time $$t_{k+\frac{1}{2}}, x_{k+1}$$

is a state variable at time $t_{k+1}$, $u_k$ is a control variable at time $$t_k, u_{k+\frac{1}{2}}$$

is a state variable at time $$t_{k+\frac{1}{2}}, u_{k+1}$$

is a control variable at time $t_{k+1}$, $h_k$ is a time length of the interpolation segment, and t is a time variable.

15. The non-transitory computer-readable storage medium of claim 11, wherein the preset conversion equation is as follows:

$$x_{plan} = x_{plan}\left(P_x^{-1}(P_x)\right);$$

$$P_x = P_x(P_t(t));$$

where $x_{plan}$ is the third gait trajectory, $P_t(t)$ is a time-related phase variable, $P_x$ is a feedback state variable determined based on the time-related phase variable, and the feedback state variable $P_x$ is determined based on the time-related phase variable and the second gait trajectory.

* * * * *